United States Patent
Guen (10) Patent No.: US 10,431,845 B2
(45) Date of Patent: Oct. 1, 2019

(54) RECHARGEABLE BATTERY (71) Applicant: SAMSUNG SDI CO., LTD., Yongin-si, Gyeonggi-do (KR)

(72) Inventor: Minhyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 37 days.

(21) Appl. No.: 15/627,857

(22) Filed: Jun. 20, 2017

(65) Prior Publication Data

US 2018/0069258 A1  Mar. 8, 2018

(30) Foreign Application Priority Data

Sep. 6, 2016 (KR) .................. 10-2016-0114634

(51) Int. Cl.
| | |
|---|---|
| H01M 10/04 | (2006.01) |
| H01G 11/56 | (2013.01) |
| H01M 4/13 | (2010.01) |
| H01M 4/36 | (2006.01) |
| H01M 4/66 | (2006.01) |
| H01M 10/05 | (2010.01) |
| H01M 2/26 | (2006.01) |
| H01G 11/72 | (2013.01) |

(Continued)

(52) U.S. Cl.
CPC .......... *H01M 10/04* (2013.01); *H01G 11/56* (2013.01); *H01G 11/72* (2013.01); *H01G 11/74* (2013.01); *H01G 11/78* (2013.01); *H01G 11/82* (2013.01); *H01M 2/263* (2013.01); *H01M 4/13* (2013.01); *H01M 4/36* (2013.01); *H01M 4/66* (2013.01); *H01M 10/05* (2013.01); *H01M 10/0431* (2013.01); *H01M 10/052* (2013.01); *H01M 10/0587* (2013.01); *Y02E 60/13* (2013.01); *Y02T 10/7022* (2013.01)

(58) Field of Classification Search
CPC ................................ H01M 2/22; H01M 2/263
See application file for complete search history.

(56) References Cited

U.S. PATENT DOCUMENTS 9,166,219 B2 * 10/2015 Suzuki ................ H01M 2/0217
2011/0151295 A1 * 6/2011 Kim ...................... H01M 2/263
429/94

(Continued)

FOREIGN PATENT DOCUMENTS

| KR | 10-1233601 B1 | 2/2013 |
|---|---|---|
| KR | 10-2015-0018344 A | 2/2015 |

Primary Examiner — Matthew J Merkling
(74) Attorney, Agent, or Firm — Lewis Roca Rothgerber Christie LLP (57) ABSTRACT A rechargeable battery includes: an electrode assembly including first and second electrodes including coated regions and uncoated region tabs, the first and second electrodes arranged and spiral-wound at opposite sides of a separator; a case to accommodate the electrode assembly; a cap plate to be combined to an opening of the case; an insulator to be arranged between the electrode assembly and the cap plate; electrode terminals to be arranged at the cap plate and to be electrically connected to the uncoated region tabs; and current collecting tabs to connect the uncoated region tabs and the electrode terminals and to be arranged between the insulator and the electrode assembly, and the current collecting tab includes an elastic protrusion protruding in a direction toward the insulator.

8 Claims, 7 Drawing Sheets (51) Int. Cl.
*H01G 11/74* (2013.01)
*H01G 11/78* (2013.01)
*H01G 11/82* (2013.01)
*H01M 10/052* (2010.01)
*H01M 10/0587* (2010.01)

(56) References Cited

U.S. PATENT DOCUMENTS

| | | |
|---|---|---|
| 2011/0244281 A1 | 10/2011 | Byun |
| 2012/0189889 A1* | 7/2012 | Kim ................. H01M 2/06 429/94 |
| 2013/0171511 A1* | 7/2013 | Masuda ............ H01M 2/0217 429/181 |
| 2013/0295445 A1* | 11/2013 | Byun ................. H01M 2/22 429/179 |
| 2014/0255768 A1* | 9/2014 | Jang ................. B23K 20/106 429/179 |
| 2014/0377639 A1* | 12/2014 | Kwak ................. H01M 2/06 429/179 |
| 2015/0044526 A1 | 2/2015 | Guen et al. |
| 2017/0018758 A1* | 1/2017 | Sawada ............. H01M 2/263 |
| 2017/0054136 A1* | 2/2017 | Byun ................. H01M 2/263 |
| 2018/0040918 A1* | 2/2018 | Guen ................. H01M 2/1241 |
| 2018/0254466 A1* | 9/2018 | Aikata ............... H01M 2/0473 |

* cited by examiner

RECHARGEABLE BATTERY

CROSS-REFERENCE TO RELATED APPLICATION

This application claims priority to and the benefit of Korean Patent Application No. 10-2016-0114634, filed on Sep. 6, 2016 in the Korean Intellectual Property Office, the entire content of which is incorporated herein by reference.

BACKGROUND

1. Field

Aspects of embodiments of the present invention relate to a rechargeable battery provided with a current collecting tab that may improve durability.

2. Description of the Related Art

Generally, a rechargeable battery is a battery that can be charged and discharged, unlike a primary battery that cannot be recharged. A low-capacity rechargeable battery has been used for small portable electronic devices, such as a mobile phone, a laptop computer, and a camcorder, while a large-capacity battery has been widely used as a power supply for driving a motor, such as for a hybrid vehicle.

As typical rechargeable batteries, there are a nickel-cadmium (Ni—Cd) battery, a nickel-metal hydride (Ni-MH) battery, a lithium (Li) battery, a lithium ion (Li-ion) battery, etc. Particularly, the lithium ion rechargeable battery has an operating voltage of about three times as high as that of the Ni—Cd battery or Ni-MH battery that is widely used as a power supply for electronic devices. In addition, the lithium ion rechargeable battery has been widely used because its energy density per unit weight is high.

In the rechargeable battery, a lithium-based oxide has been used as a positive active material, and a carbon material has been used as a negative active material. Generally, batteries are classified as a liquid electrolyte battery or a polymer electrolyte battery, depending on the type of electrolyte, and lithium batteries using a liquid electrolyte are referred to as lithium ion batteries while batteries using a polymer electrolyte are referred to as lithium polymer batteries.

Such a rechargeable battery includes an electrode assembly for performing charging and discharging operations, a case for accommodating the electrode assembly, a cap plate combined to an opening of the case, and an electrode terminal for drawing the electrode assembly out of the cap plate.

One electrode assembly may be accommodated in one case, or a plurality of electrode assemblies may be accommodated in one case. An insulator interposed between the electrode terminal and the electrode assembly electrically insulates the electrode assembly from the cap plate.

Uncoated tabs connected to the electrode assembly are electrically connected to the electrode terminals while being welded to current collecting tabs.

However, when an impact is applied from an upper side of the cap plate, cracks or the like may occur in a portion where the current collecting tab is connected by welding, and, thus, durability may be deteriorated. In addition, excessive deformation of the current collecting tab due to vibration may cause a short circuit.

The above information disclosed in this Background section is only for enhancement of understanding of the background of the invention and, therefore, it may contain information that does not form the prior art that is already known in this country to a person of ordinary skill in the art.

SUMMARY

According to an aspect of embodiments of the present invention, a rechargeable battery has improved durability of a portion in which an uncoated region tab and a current collecting tab are connected and may prevent or substantially prevent a short circuit between the uncoated region tab and the current collecting tab.

According to one or more exemplary embodiments of the present invention, a rechargeable battery includes: an electrode assembly including first and second electrodes including coated regions and uncoated region tabs, the first and second electrodes arranged and spiral-wound at opposite sides of a separator; a case to accommodate the electrode assembly; a cap plate to be combined to an opening of the case; an insulator to be arranged between the electrode assembly and the cap plate; electrode terminals to be arranged at the cap plate and to be electrically connected to the uncoated region tabs; and current collecting tabs to connect the uncoated region tabs and the electrode terminals and to be arranged between the insulator and the electrode assembly.

A side of a current collecting tab of the current collecting tabs is provided with a through-hole to be connected to the electrode terminal, and another side of the current collecting tab is connected to the uncoated region tab, and the current collecting tab includes an elastic protrusion protruding in a direction toward the insulator.

A portion of the current collecting tab connected with the uncoated region tab may be provided with a welding guide hole.

The welding guide hole may include a round hole formed in a portion thereof that is connected with the uncoated region tab, and a slit hole extending from a part of the round hole.

The elastic protrusion may protrude in a round shape from a side of the welding guide hole.

A protruding surface of the elastic protrusion may include a recess portion.

The elastic protrusion may include a first elastic piece protruding from the current collecting tab to protrude toward the insulator, and a second elastic piece protruding from the current collecting tab to protrude toward the insulator, the second elastic piece being adjacent to the first elastic piece.

The first elastic piece and the second elastic piece may protrude from the current collecting tab in a state in which front ends thereof face each other.

Edge portions of the first elastic piece and the second elastic piece that face each other may include a buffer portion.

The buffer portion may include a first bent portion bent at a protruding edge of the first elastic piece, and a second bent portion bent at a protruding edge of the second elastic piece.

According to an aspect of one or more exemplary embodiments of the present invention, even when an external impact is applied to a portion of the cap plate of the rechargeable battery, a portion in which the current collecting tab and the uncoated region tab are connected is prevented or substantially prevented from being damaged, thereby improving durability.

According to another aspect of one or more exemplary embodiments of the present invention, a short circuit between the cap plate and the current collecting tab may also be prevented or substantially prevented.

DESCRIPTION OF SYMBOLS

| | |
|---|---|
| 10 . . . electrode assembly | 11 . . . negative electrode |
| 111, 121 . . . coated region | 112, 122 . . . uncoated region tab |
| 12 . . . positive electrode | 20 . . . insulator |
| 30 . . . case | 40 . . . cap plate |
| 41 . . . vent hole | 411 . . . vent plate |
| 412 . . . notch | 42 . . . electrolyte injection opening |
| 51 . . . first electrode terminal | 52 . . . second electrode terminal |
| 60, 160, 260 . . . current collecting tab | 61 . . . through-hole |
| 63 . . . welding guide hole | 63a . . . round hole |
| 63b . . . slit hole | 65, 263 . . . elastic protrusion |
| 161 . . . recess portion | 264 . . . first elastic piece |
| 265 . . . second elastic piece | 266 . . . buffer portion |
| 266a . . . first bent portion | 266b . . . second bent portion |

DETAILED DESCRIPTION

The present invention will be described more fully hereinafter with reference to the accompanying drawings, in which some exemplary embodiments of the present invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
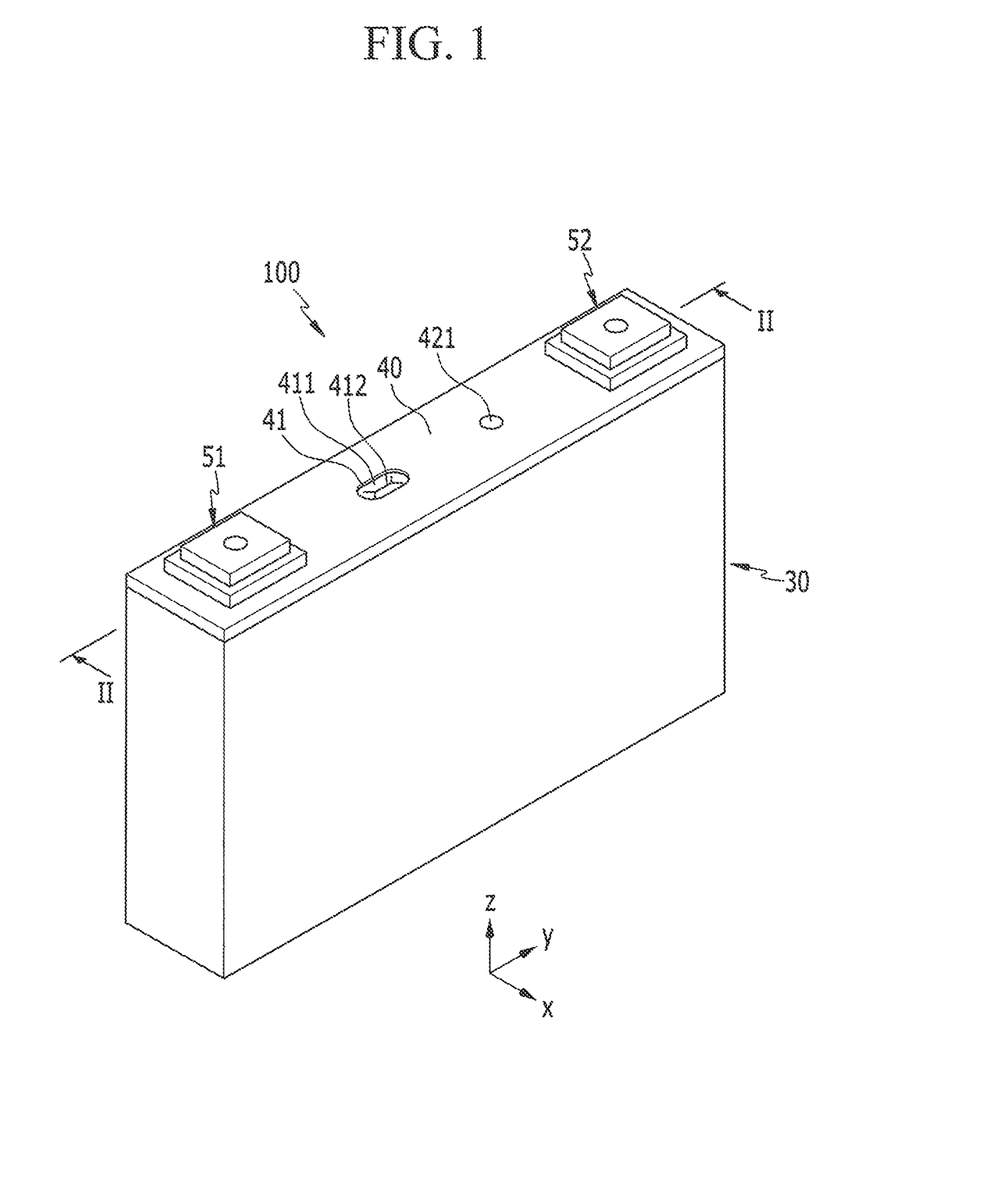
FIG. 1 illustrates a schematic perspective view of a rechargeable battery according to an exemplary embodiment of the present invention.
Figure 2:
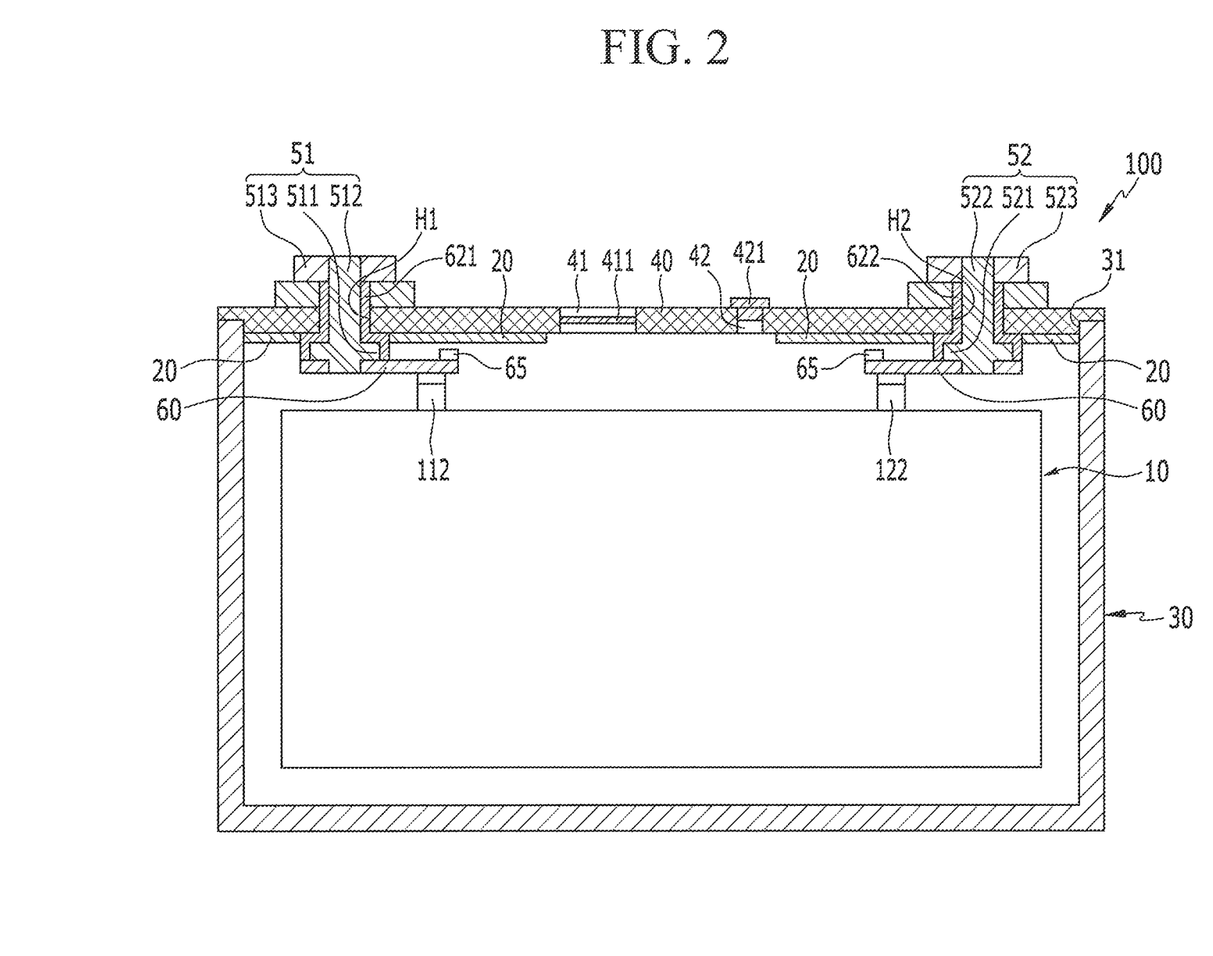
FIG. 2 illustrates a schematic cross-sectional view of the rechargeable battery of FIG. 1, taken along the line II-II.

FIG. 1 illustrates a schematic perspective view of a rechargeable battery according to an exemplary embodiment of the present invention; FIG. 2 illustrates a schematic cross-sectional view of the rechargeable battery of FIG. 1, taken along the line II-II; and FIG. 3 illustrates a schematic perspective view of a state in which a current collecting tab is connected to an electrode assembly.

Figure 3:
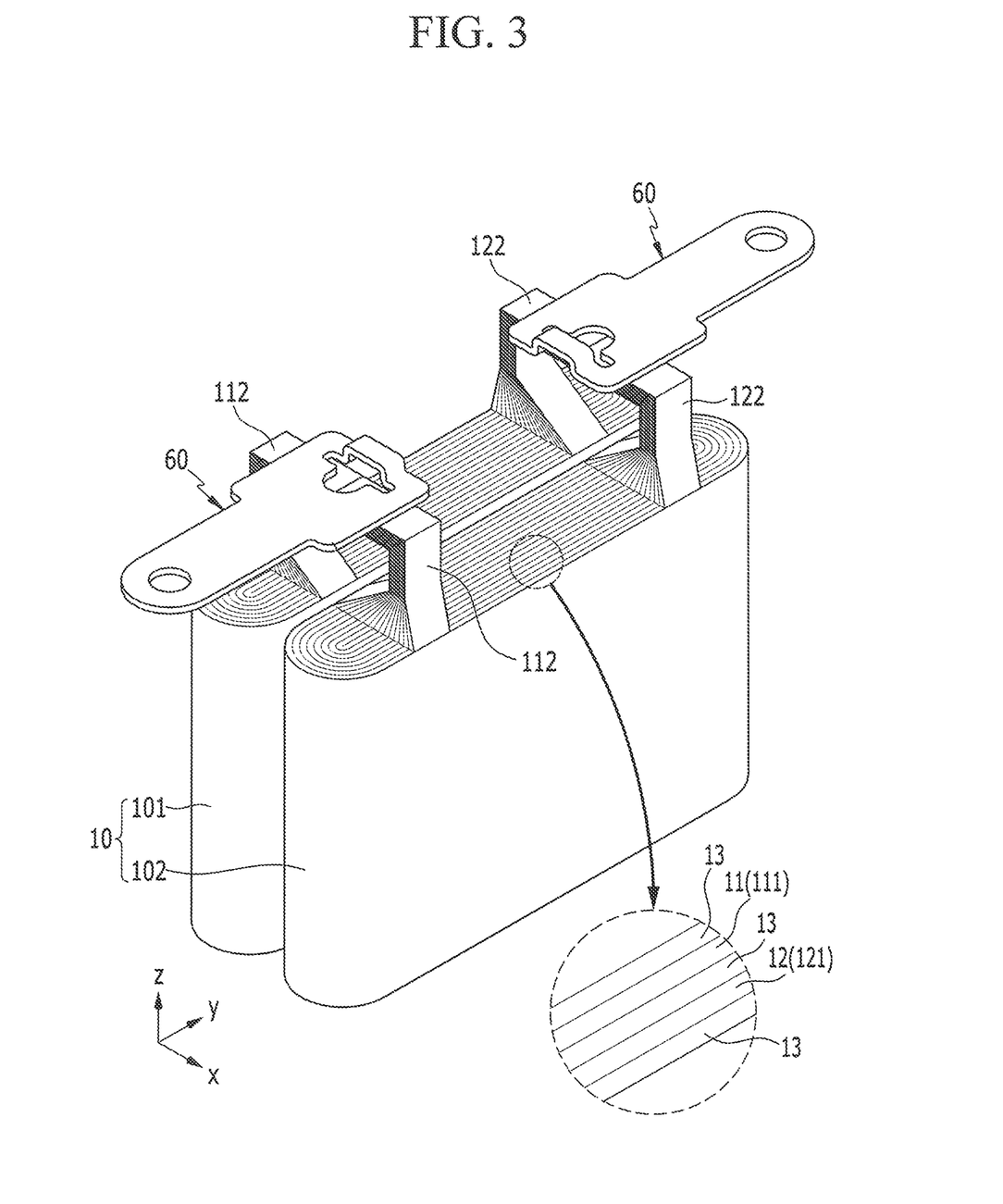
FIG. 3 illustrates a schematic perspective view of a state in which a current collecting tab is connected to an electrode assembly.

As shown in FIG. 1 to FIG. 3, a rechargeable battery 100 according to an exemplary embodiment of the present invention includes an electrode assembly 10 in which electrodes provided with coated regions 111 and 121 and uncoated region tabs 112 and 122 are disposed and spiral-wound at opposite sides of a separator 13, a case 30 for accommodating the electrode assembly 10, a cap plate 40 combined to an opening of the case 30, an insulator 20 disposed between the electrode assembly 10 and the cap plate 40, electrode terminals 51 and 52 disposed at the cap plate 40 to be electrically connected to the uncoated region tabs 112 and 122, and current collecting tabs 60 that respectively connect the uncoated region tabs 112 and 122 and the electrode terminals 51 and 52 and are disposed between the insulator 20 and the electrode assembly 10.

The case 30 is provided with a space that may accommodate the electrode assembly 10 of a plate or substantially plate shape. In an embodiment, for example, the case 30 is formed to have a substantially cuboidal shape, and one side thereof is provided with a rectangular opening 31 through which the electrode assembly 10 is inserted.

The cap plate 40 is combined to the opening 31 of the case 30 to seal the case 30, and is provided with two terminal holes H1 and H2. For example, the electrode terminals 51 and 52 are provided in the terminal holes H1 and H2. As an example, the case 30 and the cap plate 40 are made of aluminum, and are welded to each other at the opening 31.

In an embodiment, the cap plate 40 is further provided with a vent hole 41 and an electrolyte injection opening 42. The vent hole 41 is sealed by a vent plate 411 so as to discharge an internal pressure due to gas generated in the rechargeable battery 100 according to charging and discharging of the electrode assembly 10.

When the internal pressure of the rechargeable battery 100 reaches a pressure (e.g., a predetermined pressure), the vent plate 411 is ruptured to open the vent hole 41, thereby discharging gas and internal pressure generated by overcharging. The vent plate 411 may include a notch 412 for inducing the rupture.

The electrolyte injection opening 42 allows an electrolyte solution to be injected into the case 30 after the cap plate 40 is combined and welded to the case 30. After the electrolyte solution is injected, the electrolyte injection opening 42 is sealed with a sealing stopper 421.

The insulator 20 is made of an electrically insulating material, and may be disposed to contact a surface of the cap plate 40 inside the case 30 to electrically insulate the electrode assembly 10 from the cap plate 40.

Negative and positive electrodes 11 and 12 respectively include the coated regions 111 and 121 corresponding to current collectors made of a metal foil (e.g., a copper (Cu) or aluminum (Al) foil) on which active materials are coated, and the uncoated region tabs 112 and 122 respectively corresponding to exposed current collectors on which active materials are not coated. The uncoated region tabs 112 and 122 are disposed at one end of the spiral-wound electrode assembly 10, and are spaced apart from each other by a distance from one end thereof within one winding range of the electrode assembly 10.

The electrode assembly 10 may be formed as one electrode assembly (not shown), but, in the exemplary embodiment shown in FIG. 3, two electrode assemblies are formed in the electrode assembly 10. That is, in an embodiment, the electrode assembly 10 includes a first assembly 101 and a second assembly 102 that are disposed to be parallel in a width direction (e.g., an x-axis direction) of the cap plate 40. The first and second assemblies 101 and 102 may be formed to have a semi-circular plate shape formed at opposite ends along a y-axis direction to be accommodated in the case 30 of a substantially cuboidal shape.

In an embodiment, the uncoated region tabs 112 and 122 may be formed as a plurality of groups. The uncoated region tabs 112 and 122 may be connected to the respective current collecting tabs 60.

The first and second electrode terminals 51 and 52 are respectively connected to the uncoated region tabs 112 and 122 through the respective current collecting tabs 60 such that a current may be discharged from the first and second assemblies 101 and 102 or charged thereto.

In an embodiment, the first and second electrode terminals 51 and 52 may be formed to have the same structure. Referring to FIG. 2, in an embodiment, the first and second electrode terminals 51 and 52 include rivets 512 and 522, inner plates 511 and 521, and outer plates 513 and 523, respectively.

The first and second electrode terminals 51 and 52 may be electrically insulated from the cap plate 40 by respective gaskets 621 and 622 interposed between the first and second electrode terminals 51 and 52 and an inner surface of the cap plate 40.

The respective current collecting tabs 60 may be disposed to connect the uncoated region tabs 112 and 122 and the electrode terminals 51 and 52.

Figure 4:
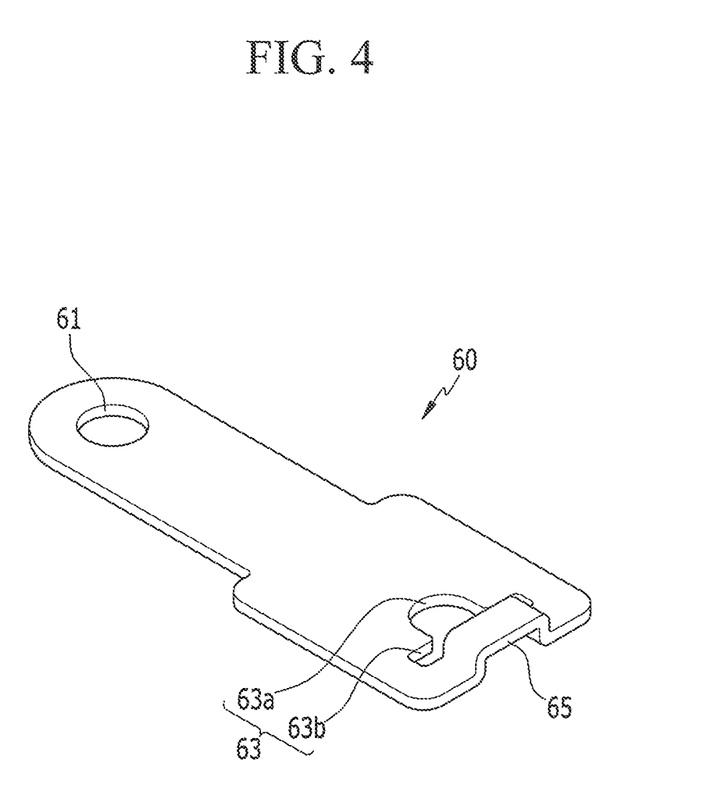
FIG. 4 illustrates a schematic perspective view of a current collecting tab according to an exemplary embodiment of the present invention.
Figure 5:
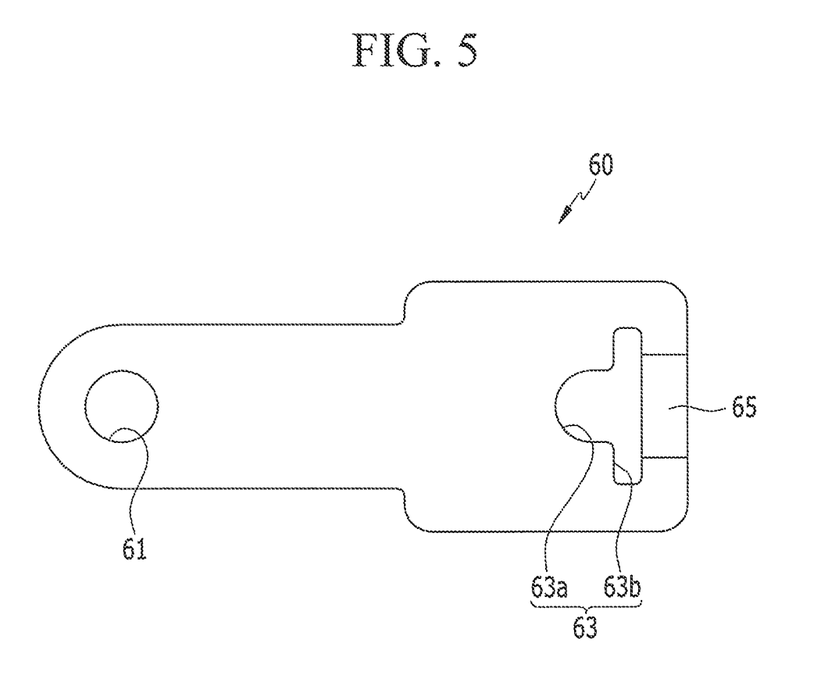
FIG. 5 illustrates a schematic top view of the current collecting tab of FIG. 4.

FIG. 4 illustrates a schematic perspective view of a current collecting tab according to an exemplary embodiment of the present invention; FIG. 5 illustrates a schematic top view of the current collecting tab of FIG. 4; and FIG. 6 illustrates a schematic side view of a state in which an elastic protrusion protrudes from the current collecting tab of FIG. 4.

Figure 6:
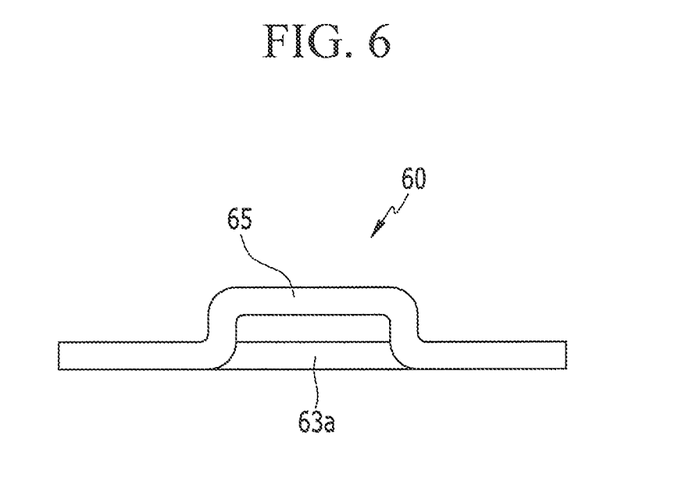
FIG. 6 illustrates a schematic side view of a state in which an elastic protrusion protrudes from the current collecting tab of FIG. 4.

As shown in FIG. 4 to FIG. 6, a through-hole 61 connected to the electrode terminals 51 and 52 is provided at one side of the current collecting tab 60, and the other side thereof is electrically connected to the uncoated region tabs 112 and 122.

The current collecting tab 60 is electrically connected in a state in which the electrode terminals 51 and 52 are inserted in the through-hole 61, and the other side thereof may be electrically connected to the uncoated region tabs 112 and 122.

The current collecting tab 60 and the uncoated region tabs 112 and 122 are electrically connected by welding. For this, the current collecting tab 60 is provided with a welding guide hole 63 for welding the uncoated region tabs 112 and 122 thereto.

The welding guide hole 63 may be formed to penetrate each of the current collecting tabs 60 such that the respective current collecting tabs 60 may be stably welded to the uncoated region tabs 112 and 122.

Since the current collecting tab 60 may be welded to the uncoated region tabs 112 and 122 along an opened edge of the welding guide hole 63, it is possible to more easily perform the welding and to effectively connect the current collecting tab 60 and the uncoated region tabs 112 and 122.

The welding guide hole 63 may include a round hole 63*a* formed in a portion connected to the uncoated region tabs 112 and 122 and a slit hole 63*b* extending from part of the round hole 63*a*.

The round hole 63*a* that is formed in a semi-circular shape in a side portion facing a portion of the current collecting tab 60 in which the through hole 61 is formed will be described according to an embodiment. However, the round hole 63*a* is not limited to the semi-circular shape, and may be formed to have any of various shapes, such as a spherical shape, an elliptical shape, or the like.

The slit hole 63*b* may be formed in part of the round hole 63*a*.

Since, in an embodiment, the slit hole 63*b* is formed to extend from part of the round hole 63*a*, it may further enlarge an opened size in a direction of the uncoated region tabs 112 and 122. Accordingly, the slit hole 63*b* may increase the welding area of the current collecting tab 60 and the uncoated region tabs 112 and 122, thereby improving efficiency of welding work.

An elastic protrusion 65 is provided at a side of the welding guide hole 63.

The elastic protrusion 65 may protrude from the side of the welding guide hole 63 toward an upper portion of the current collecting tab 60, that is, toward the insulator 20. The elastic protrusion 65 is provided in the current collecting tab 60 to prevent or substantially prevent the current collecting tab 60 from being damaged by impact vibration when an impact occurs from the outside of the rechargeable battery 100.

The elastic protrusion 65 protrudes to compensate a space between the current collecting tab 60 and the insulator 20.

Accordingly, when an impact is applied to the rechargeable battery 100, it is possible to prevent or substantially prevent the current collecting tab 60 from being vibrated due to the impact vibration through the elastic protrusion 65. Thus, it is possible to effectively prevent or substantially prevent damage to the welded portions of the current collecting tab 60 and the uncoated region tabs 112 and 122 from being caused by cracks.

In an embodiment, the elastic protrusion 65 may protrude in a round shape from the side of the welding guide hole 63. That is, since the elastic protrusion 65 partially protrudes to have the round shape with elastic force, it is possible to prevent or substantially prevent damage from occurring in a process of contacting the insulator 20.

As described above, even when the external impact is applied to the rechargeable battery 100 of the present exemplary embodiment, the portion in which the current collecting tab 60 and the uncoated region tabs 112, 122 are connected is prevented or substantially prevent from being damaged, thereby improving durability. In addition, it is possible to prevent or substantially prevent a short circuit from occurring between the cap plate 40 and the current collecting tab 60.

Figure 7:
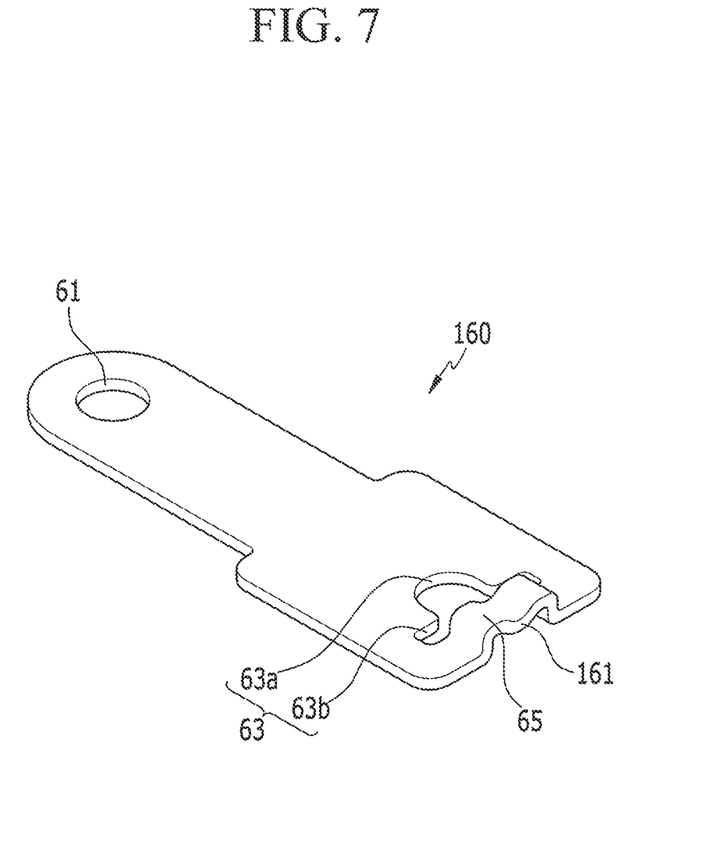
FIG. 7 illustrates a schematic perspective view of a current collecting tab according to another exemplary embodiment of the present invention.
Figure 8:
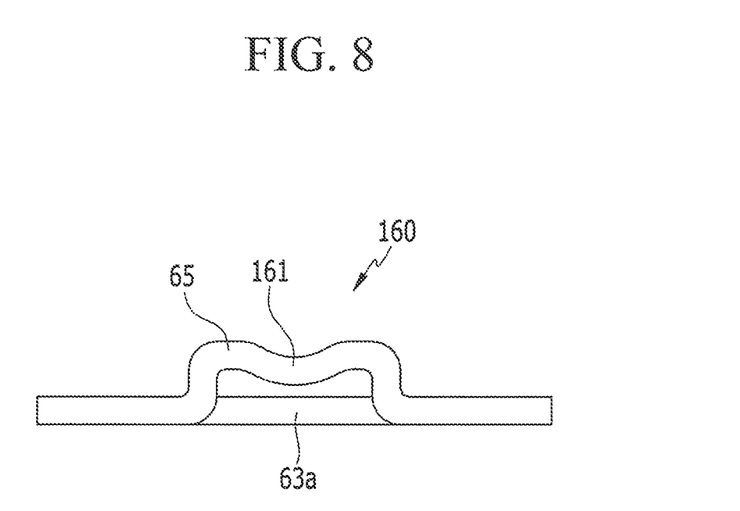
FIG. 8 illustrates a schematic side view of a state in which an elastic protrusion protrudes from the current collecting tab of FIG. 7.

FIG. 7 illustrates a schematic perspective view of a current collecting tab according to another exemplary embodiment of the present invention; and FIG. 8 illustrates a schematic side view of a state in which an elastic protrusion protrudes from the current collecting tab of FIG. 7. The same reference numerals as those in FIGS. 1 to 6 refer to the same or like members or components having the same or like functions. Further description of those components having the same reference numerals will not be repeated.

As shown in FIG. 7 and FIG. 8, in a current collecting tab 160 of a rechargeable battery according another exemplary embodiment of the present invention, a recess portion 161 is provided in a protruding surface of the elastic protrusion 65.

The recess portion 161 is formed to have a shape that is inwardly concave from the protruding surface of the elastic protrusion 65, and, according to an embodiment, one recess portion 161 is formed in the protruding surface of the elastic protrusion 65. However, the present invention is not limited to one recess portion 161 being formed in the protruding surface of the elastic protrusion 65, but, rather, in another embodiment, at least two recess portions 161 may be formed in the protruding surface of the elastic protrusion 65.

In an embodiment, since the recess portion 161 is provided in the surface of the elastic protrusion 65 such that the elastic protrusion 65 may be easily elastically deformed, it is possible to effectively prevent or substantially prevent occurrence of contact damage when an external impact occurs.

Figure 9:
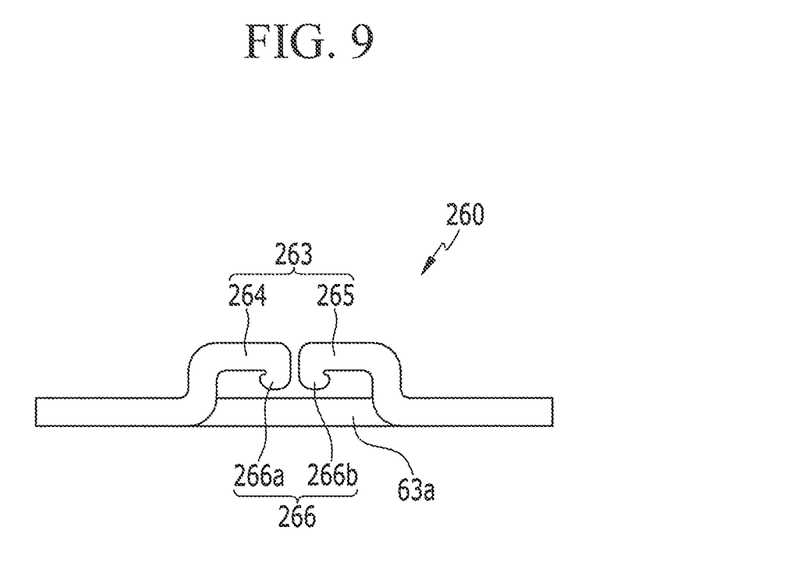
FIG. 9 illustrates a schematic side view of a state in which an elastic protrusion protrudes from a current collecting tab according to another exemplary embodiment of the present invention.

FIG. 9 illustrates a schematic side view of a state in which an elastic protrusion protrudes from a current collecting tab according to another exemplary embodiment of the present invention. The same reference numerals as those in FIGS. 1 to 8 refer to the same or like members having the same or like functions. Further description of those components having the same reference numerals will not be repeated.

As shown in FIG. 9, in a current collecting tab 260 of a rechargeable battery according to another exemplary embodiment of the present invention, an elastic protrusion 263 includes a first elastic piece 264 protruding from the current collecting tab 260 toward the insulator 20 and a second elastic piece 265 protruding from the current collecting tab 60 toward the insulator 20 while facing the first elastic piece 264.

The first elastic piece 264 protrudes from one side of the welding guide hole 63 of the current collecting tab 260 toward the insulator 20.

The second elastic piece 265 protrudes from the other side of the welding guide hole 63 of the current collecting tab 260 toward the insulator 20, and has the same shape as the first elastic piece 264.

As such, since the elastic protrusion 263 includes the first elastic piece 264 and the second elastic piece 265 which protrude to an upper portion of the current collecting tab 260, when an external impact is applied, elastic force acts more uniformly, and thus damage caused by impact vibration may be effectively reduced.

The first elastic piece 264 and the second elastic piece 265 are respectively connected with the current collecting tab 260, and the protruding ends thereof may be positioned to face each other with an interval (e.g., a predetermined interval) therebetween. Each of the protruding ends of the first elastic piece 264 and the second elastic piece 265 may be provided with a buffer portion 266.

The buffer portion 266 may include a first bent portion 266a that is bent at a protruding edge of the first elastic piece 264 and a second bent portion 266b that is bent at a protruding edge of the second elastic piece 265.

The first bent portion 266a may be bent to have a rounded shape at the protruding edge of the first elastic piece 264.

The second bent portion 266b may be bent to have a rounded shape at the protruding edge of the second elastic piece 265.

As such, in an embodiment, since the first bent portion 266a and the second bent portion 266b are respectively provided at the first elastic piece 264 and the second elastic piece 265, it is possible to prevent or substantially prevent damage due to collision through elastic deformation of the first elastic piece 264 and the second elastic piece 265.

While the present invention has been described in connection with what are presently considered to be some practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly comprising first and second electrodes including coated regions and uncoated region tabs, the first and second electrodes arranged and spiral-wound at opposite sides of a separator;
a case to accommodate the electrode assembly;
a cap plate to be combined to an opening of the case;
an insulator to be arranged between the electrode assembly and the cap plate;
electrode terminals to be arranged at the cap plate and to be electrically connected to the uncoated region tabs; and
current collecting tabs to connect the uncoated region tabs and the electrode terminals and to be arranged between the insulator and the electrode assembly,
wherein a side of a current collecting tab of the current collecting tabs is provided with a through-hole to be connected to the electrode terminal, and another side of the current collecting tab is welded to the uncoated region tab, wherein the uncoated region tabs protrude from one end of the electrode assembly in a direction toward the insulator, and wherein the current collecting tab comprises an elastic protrusion protruding in the direction toward the insulator to be arranged between the insulator and a portion of the current collecting tab welded with the uncoated region tab, and
wherein the portion of the current collecting tab welded with the uncoated region tab is provided with a welding guide hole and is welded with the uncoated region tab along an edge of the welding guide hole.

2. The rechargeable battery of claim 1, wherein the welding guide hole includes:
a round hole formed in a portion thereof that is connected with the uncoated region tab, and
a slit hole extending from a part of the round hole.

3. The rechargeable battery of claim 1, wherein the elastic protrusion protrudes in a round shape from a side of the welding guide hole.

4. The rechargeable battery of claim 1, wherein a protruding surface of the elastic protrusion comprises a recess portion.

5. A rechargeable battery comprising:
an electrode assembly comprising first and second electrodes including coated regions and uncoated region tabs, the first and second electrodes arranged and spiral-wound at opposite sides of a separator;
a case to accommodate the electrode assembly;
a cap plate to be combined to an opening of the case;
an insulator to be arranged between the electrode assembly and the cap plate;
electrode terminals to be arranged at the cap plate and to be electrically connected to the uncoated region tabs; and
current collecting tabs to connect the uncoated region tabs and the electrode terminals and to be arranged between the insulator and the electrode assembly,
wherein a side of a current collecting tab of the current collecting tabs is provided with a through-hole to be connected to the electrode terminal, and another side of the current collecting tab is connected to the uncoated region tab, and wherein the current collecting tab comprises an elastic protrusion protruding in a direction toward the insulator,
wherein a portion of the current collecting tab connected with the uncoated region tab is provided with a welding guide hole, and wherein the elastic protrusion comprises:
- a first elastic piece protruding from the current collecting tab to protrude toward the insulator, and
- a second elastic piece protruding from the current collecting tab to protrude toward the insulator, the second elastic piece being adjacent to the first elastic piece.

6. The rechargeable battery of claim 5, wherein the first elastic piece and the second elastic piece protrude from the current collecting tab in a state in which front ends thereof face each other.

7. The rechargeable battery of claim 5, wherein edge portions of the first elastic piece and the second elastic piece that face each other include a buffer portion.

8. The rechargeable battery of claim 7, wherein the buffer portion includes a first bent portion bent at a protruding edge of the first elastic piece, and a second bent portion bent at a protruding edge of the second elastic piece.

\* \* \* \* \*